United States Patent [19]

Lehtinen

[11] 4,350,394

[45] Sep. 21, 1982

[54] SECTIONAL WHEEL WITH RELATIVELY ROTATABLE SECTIONS

[76] Inventor: John G. Lehtinen, 621 Lochaven, Union Lake, Mich. 48085

[21] Appl. No.: 163,862

[22] Filed: Jun. 27, 1980

[51] Int. Cl.³ .............................................. B60B 11/00
[52] U.S. Cl. ................................. 301/38 R; 267/150; 403/229; 464/61
[58] Field of Search ............ 301/5 R, 9 R, 9 G, 36 A, 301/38 R, 385, 405; 64/27 C; 267/150, 174, 166; 403/229

[56] References Cited

U.S. PATENT DOCUMENTS

| 2,371,130 | 3/1945 | Cushman | 267/166 |
| 2,496,890 | 2/1950 | Peterson | 64/27 C |
| 2,543,876 | 3/1951 | Smith | 64/27 C |
| 2,616,274 | 11/1952 | Landtuit | 64/27 C |
| 4,035,027 | 7/1977 | Lehtinen | 301/38 R |

FOREIGN PATENT DOCUMENTS 281094 12/1970 U.S.S.R. ................................. 267/66

*Primary Examiner*—H. Grant Skaggs
*Attorney, Agent, or Firm*—Harvey B. Jacobson

[57] ABSTRACT

First and second wheel sections are provided with the first section including structure for attachment to a vehicle wheel for rotation therewith. Structure is provided supporting the second section from the first section for angular displacement relative thereto about a predetermined axis and the first and second sections include outer partial circular edges having the aforementioned axes as their centers of curvature. The sections are relatively rotatably between first positions with the partial circular edges together defining an outer circular periphery of the wheel and second positions with the sections relatively angularly displaced 180° and the partial circular edges thereof disposed in side-by-side relation. First latch structure is operatively connected between the sections for automatically releasably latching the sections in the first positions thereof upon displacement thereto from the second positions, and second latch structure is provided and operative to releasably latch the sections in the second positions thereof. Spring structure is provided and operatively connected between the sections for yieldingly resisting angular displacement of the second section relative to the first section, in either direction, from a position with the first and second sections in the first positions toward positions with the first and second sections in the second positions.

9 Claims, 11 Drawing Figures

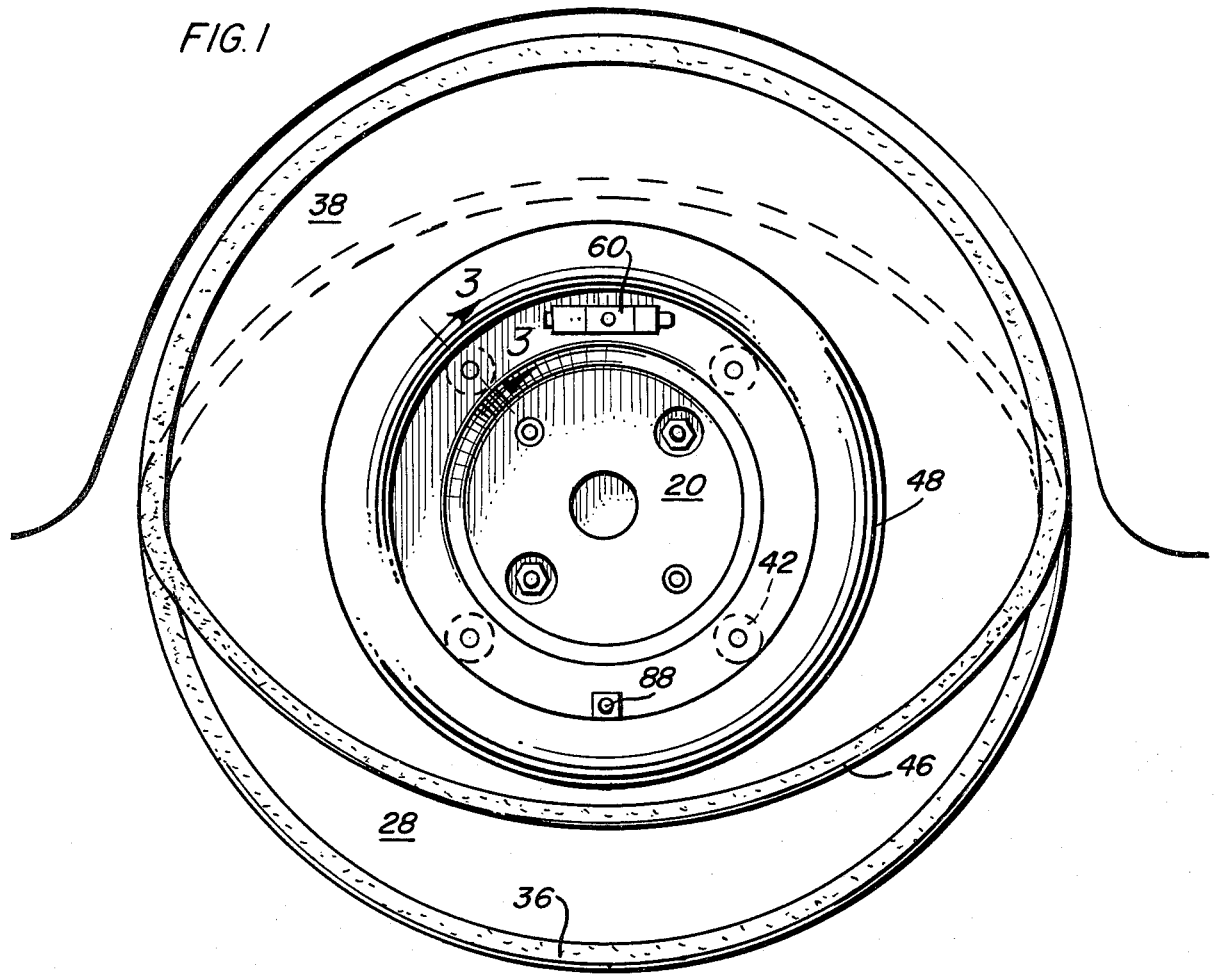
FIG. 1
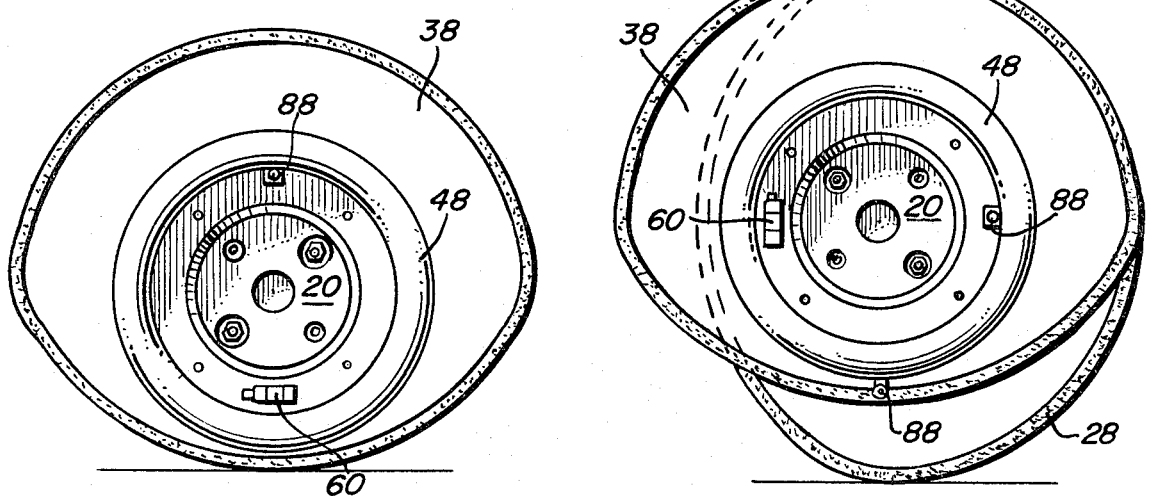
FIG. 8
FIG. 9

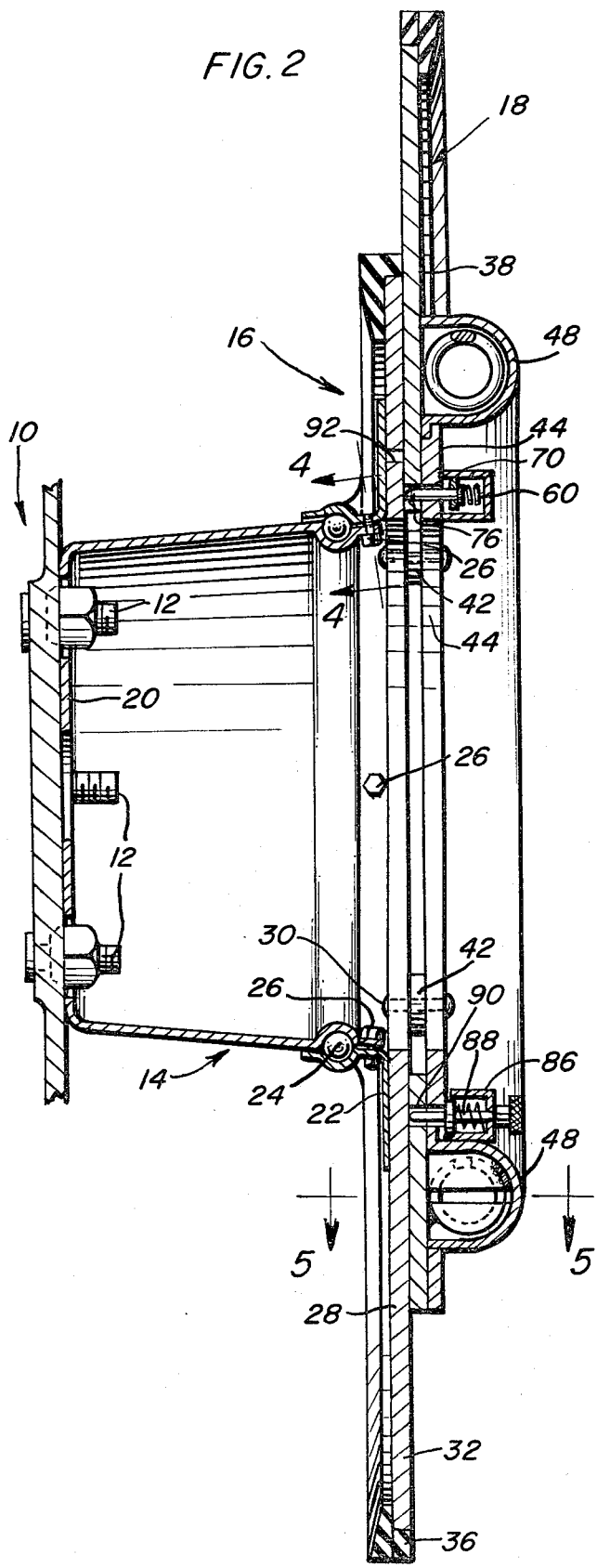
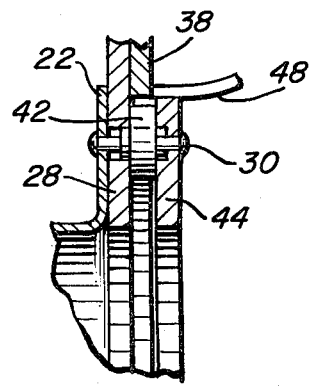
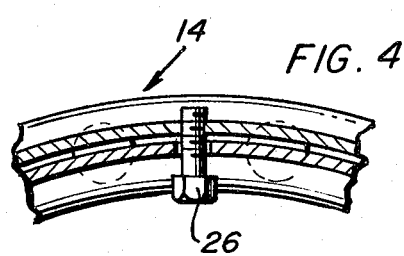
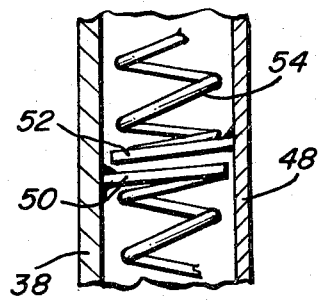
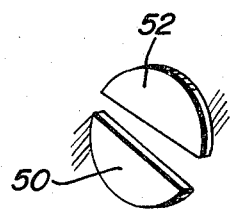

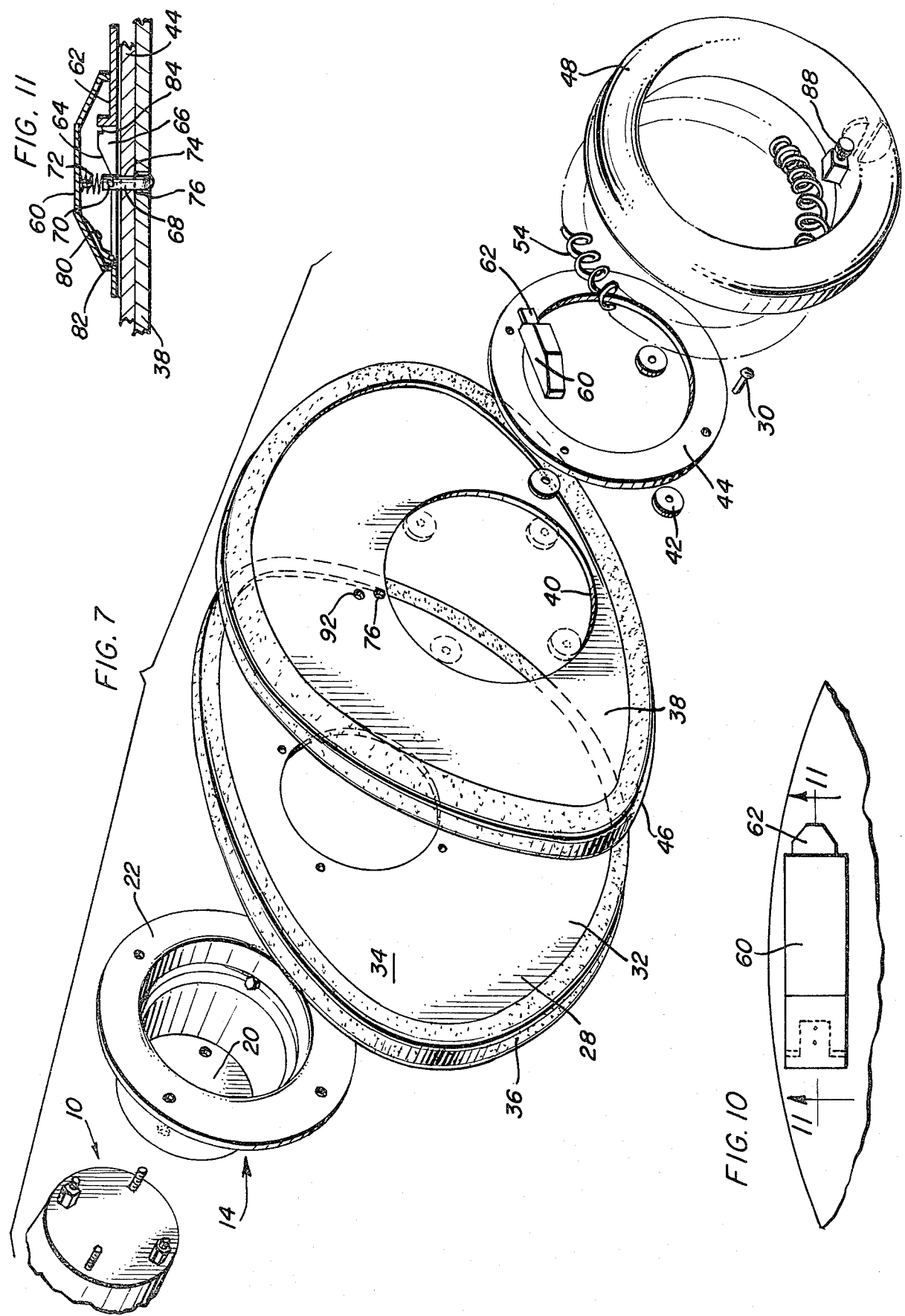

SECTIONAL WHEEL WITH RELATIVELY ROTATABLE SECTIONS

BACKGROUND OF THE INVENTION

The instant invention comprises an improvement over the emergency wheel disclosed in my prior U.S. Pat. No. 4,035,027, dated July 12, 1977.

Various forms of emergency wheels heretofore have been provided for ready attachment to the outer side of a vehicle wheel having a flat tire mounted thereon. Some of these emergency wheels include relatively shiftable sections thereof shiftable between collapsed positions defining less than a full circular outer periphery and extended positons forming a full circular outer peripheral portion. However, most of these previously known forms of emergency wheels not only require initial mounting of the emergency on an associated wheel having a flat tire associated therewith, but also manipulation of the emergency wheel to compensate for the flatten peripheral portion of the associated vehicle tire during mounting of the emergency wheel thereon and also manual shifting of the relatively movable components of the emergency wheel to the full circular outer periphery defining state of the emergency wheel and locking of the shiftable wheel components in the full circular outer periphery defining positions.

Accordingly, a need exists for an emergency wheel constructed in a manner whereby shifting of the relatively movable emergency wheel sections to the inoperative positions thereof for mounting on an associated vehicle wheel may be readily effected and subsequent shifting of the emergency wheel sections to the operative positions thereof after mounting of the emergency wheel on an associated vehicle wheel may be automatically accomplished. Also, in some instances a vehicle wheel bearing will "freeze" locking the wheel stationary and there is also a need for an emergency wheel including a vehicle wheel mountable hook portion and an outer periphery defining portion mounted on the hub portion for selective rotation relative thereto.

BRIEF DESCRIPTION OF THE INVENTION

The emergency wheel of the instant invention includes first and second sections with the second section relatively rotatable relative to the first section and shiftable between a first position with partial circular edges of the first and second sections together defining an outer circular periphery and second a position with the second section angularly displaced approximately 180° relative to the first section and the outer partial circular edges of the sections disposed in side-by-side relation. First latch structure is operatively connected between the first and second sections and is operative to automatically releasably latch the second section in the first position thereof upon angular displacement of the second section thereto and second latch structure is carried by the emergency wheel and is operative to releasably latch the second section of the wheel in the second position thereof. Further, spring structure is operatively connected between the first and second wheel sections for yieldingly biasing the second section toward the first position thereof from any angularly displaced position (in either direction) between the first and second positions of the second section.

The main object of this invention is to provide an emergency wheel which may be readily mounted on the exterior of an associated vehicle wheel having a flat tire thereon without jacking up the wheel by conventional means and with the emergency wheel capable of serving the operational function of the vehicle wheel when its tire is inflated.

Another object of this invention is to provide an emergency wheel which, after having been mounted on the associated vehicle wheel in an inoperative position, will automatically shift a shiftable component thereof toward the operative position upon rotation of the associated vehicle wheel in either direction.

Yet another object of this invention is to provide an emergency wheel for attachment to an associated vehicle wheel and which includes bearing means operative to rotatably support the circular load bearing surface defining portions of the emergency wheel for rotation relative to the associated vehicle wheel in the event the vehicle wheel is disabled so that it may not rotate in the usual manner.

Another object of this invention is to provide an emergency wheel whose operational components thereof are arranged relative to each other to provide a wheel which is substantially statically and dynamically balanced when in use.

A final object of this invention to be specifically enumerated herein is to provide an emergency wheel in accordance with the preceding objects and which will conform to conventional forms of manufacture, be of simple construction and easy to use so as to provide a device that will be economically feasible long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an outer side elevational view of the sectional wheel of the instant invention as mounted upon a conventional vehicle wheel and with the relatively shiftable component of the sectional wheel positioned relative to each other to define an emergency wheel having a circular outer periphery;

FIG. 2 is an enlarged vertical sectional view taken substantially upon a plane passing through the central portion of the emergency wheel and fragmentarily illustrating the associated vehicle wheel;

FIG. 3 is an enlarged fragmentary sectional view taken substantially upon a plane indicated by the section line 3—3 of FIG. 1;

FIG. 4 is a fragmentary enlarged vertical sectional view taken substantially upon the plane indicated by the section line 4—4 of FIG. 2;

FIG. 5 is a fragmentary enlarged horizontal sectional view taken substantially upon the plane indicated by the section line 5—5 of FIG. 2;

FIG. 6 is a perspective view illustrating the half moon spring abutment portions of the sectional wheel which are supported from relatively rotatable sections thereof;

FIG. 7 is an exploded perspective view of the sectional wheel;

FIG. 8 is an outer side elevational view of the sectional wheel with the relatively rotatable sections thereof in retracted inoperative positions;

FIG. 9 is an outer side elevational view of the section wheel with the relatively rotatable components thereof in adjusted rotated positions half way between the retracted inoperative positions thereof and the operative positions thereof;

FIG. 10 is a fragmentary outer side elevational view of the automatic structure; and FIG. 11 is a fragmentary sectional view taken substantially upon the plane indicated by the section line 11—11 of FIG. 10.

DETAILED DESCRIPTION OF THE INVENTION

Referring now more specifically to the drawings, the numeral 10 generally designates a conventional vehicle wheel including four outwardly projecting wheel mounting studs 12. The sectional wheel of the instant invention is referred to in general by the reference numeral 14 and includes first and second relatively rotatable sections 16 and 18. The first section 16 includes a hub 20 which may be mounted on the associated vehicle wheel in manner substantially identical to the manner in which the hub (32) of my abovenoted prior patent may be mounted on an associated vehicle wheel. The first section 16 includes a mounting flange 22 journalled from the hub 20 by a bearing assembly 24 and removable fasteners 26 are secured between the hub 20 and the mounting flange 22 to releasably lock the mounting flange 22 against rotation relative to the hub 20.

The first section 16 includes a cam disc 28 mounted to the mounting flange 22 through the utilization of circumferentially spaced fasteners 30 and the cam disc 28 includes a first half peripheral portion 32 which is semicircular in outer peripheral shape. The disc 28 includes a second half peripheral portion which is of lesser radial extent and the entire periphery of the cam disc 28 includes a resilient outer rim 36. The second section 18 comprises a second cam disc 38 having a central opening 40 therein and rotatably supported from the cam disc 28 through the utilization of rollers 42 journalled on the fasteners 30, the rollers 42 engaging the peripheral edges of the central opening 40. An anchor ring 44 overlies the side of the cam disc 38 remote from the cam disc 28 and the fasteners 30 are also secured through the anchor ring 44.

The cam disc 38 is of substantially the same outer peripheral configuration as the cam disc 28 and the disc 38 includes a resilient outer rim 46 corresponding the outer rim 36. An annular spring housing 48 is carried by ring 44 (and thus locked against rotation relative to the cam disc 28) and one side of the housing 48 opposing the cam disc 38 and is open. A one-half moon stop 50 is disposed within the housing 48 and anchored relative to the cam disc 38 and a second one-half moon stop 52 is disposed within the housing 48 and anchored relative to the latter. A coil spring 54 is disposed within the housing 48 and has its opposite ends engaged with the stops 50 and 52. The stop 50, being supported from the cam disc 38, may thus be angularly displaced about the center axis of the sectional wheel 14 and movement of the second section 18 relative to the first section 16 (in either direction) from a position with the stops 50 and 52 aligned will cause the spring 54 to be compressed. When the stops 50 and 52 are registered with each other, the sections 16 and 18 are disposed in the relatively angularly displaced positions thereof illustrated therein FIG. 1 of the drawings with the semi-circular peripheral portions thereof substantially coextensive and the wheel 14 defining a continuous circular outer periphery.

The abutment ring 44 includes a housing 60 supported therefrom in which an elongated longitudinally slotted cam plate 62 is supported for longitudinal back and forth shifting. The cam plate 62 includes a pair of cam surfaces 64 disposed on opposite sides of the longitudinal slot 66. A locking pin 68 is slidingly received in the slot 66 and includes an upper cross head 70 ridable upwardly along the cam surfaces 64, the pin 68 being spring biased by a compression spring 72. The pin 68 is projectable through a bore 74 formed in the ring 44 and is receivable in a bore 76 formed in the cam disc 38 when the cam discs 28 and 38 are in the relative positions thereof illustrated in FIG. 2. The housing includes an internal spring 80 seatable in a recess 82 formed in the cam plate 62 in order to releasably retain the cam plate 62 in the position thereof illustrated in FIG. 11. The upper end portions of the cam surfaces 64 include notches 84 formed therein in which to seatingly receive the opposite ends of the cross pin 70 for retaining the pin 68 in a retracted position out of the bore 76, when desired.

The cam disc 38 includes a hollow housing 86 supported therefrom in which a spring biased latch pin 88 is reciprocally received. The latch pin 88 projects into a bore 90 formed in the cam disc 38 and may be extended into position received within the bore 92 formed in the cam disc 28 in order to retain the cam discs 28 and 38 in the relative positions thereof illustrated in FIG. 8, see FIG. 2.

In operation, the sectional wheel 14 is secured to the wheel 10 with the cam discs 28 and 38 in the relative positions thereof illustrated in FIG. 8 of the drawings with the latch pin 88 extended and projecting into the bore 92, the latch pin 68 being retracted and the bore 76 displaced 180° relative to the pin 68 due to the discs 28 and 38 being relatively positioned in the manner illustrated in FIG. 8. Of course, when the discs 28 and 38 are rotated to the positions thereof illustrated in FIG. 8 of the drawings, the compression spring 54 is loaded and after the support wheel 14 has been fully mounted on the wheel 10, the latch pin 88 may be retracted from the bore 82 whereby the trailing end of the semi-circular outer periphery of the cam disc 38 will be biased down toward engagement with the ground. As the wheel 10 then rotates in order to advance the associated vehicle, the discs 28 and 38 will slowly relatively pivot toward the extended full circle periphery wheel defining positions thereof illustrated in FIG. 2. When the discs 28 and 38 are finally rotated to the positions thereof illustrated in FIG. 2, the pin 68 will automatically lock in the bore 76, the cam plate 62 having been previously displaced to the right as viewed in FIG. 11 in order to release the pin 68 for extension into the bore 76.

According to the direction of initial intended rotation of the wheel 10, the cam disc 38 may be preloaded in the opposite direction against the biasing action of the spring 54 in order that the trailing edge of the cam disc 38 may contact the ground and thus allow vehicle 10 to move upwardly along the first half peripheral portion 34 of the cam disc 28.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An emergency wheel including first and second sections, said first section including means for attaching said first section to a vehicle wheel for rotation with the said wheel, means supporting said second section from said first section for angular displacement relative thereto about a predetermined axis, said first and second sections including outer partial circular edges having said axis as their centers of curvature, said sections being relatively rotatable between first positions with said edges together defining an outer circular periphery of said wheel and second relatively 180° displaced positions with said partial circular edges disposed in side-by-side relation, first latch means operatively connected between said first and second sections for releasably latching said sections in said first positions, second latch means operative to releasably latch said sections in said second positions, and spring means operatively connected between said sections operative to yieldingly bias said first and second sections from said second positions thereof to said first positions thereof.

2. The combination of claim 1 wherein said partial circular edges include strips of resilient material extending therealong.

3. The combination of claim 1 wherein said spring means is operatively connected between said first and second sections in a manner operative to yieldingly bias said second section for rotation relative to said first section in opposite directions.

4. The combination of claim 1 wherein said first section includes a hub portion rotatably supported therefrom and including structure for support of said hub portion from the center portion of an associated vehicle wheel and means releasably locking said hub portion against rotation relative to said first section.

5. The combination of claim 4 wherein said hub portion includes a plurality of large and small diameter openings formed through said hub portion spaced about and equally from the axis of rotation of said hub portion relative to said first section, said openings being arranged in said conventional wheel lug pattern.

6. The combination of claim 1 wherein said first section includes a central opening formed therein and an abutment ring overlying the outer side of said first section in spaced relation relative thereto, said second section including a central opening formed therein and being disposed between said abutment ring and first section, a plurality of rollers spaced about said central opening in said first section and journalled from and between the latter and said abutment ring, said rollers being rollingly engaged with the surfaces of said second section defining the central opening formed therethrough.

7. The combination of claim 6 wherein said partial circular edges include strips of resilient material extending therealong.

8. The combination of claim 7 wherein said spring means is operatively connected between said first and second sections in a manner operative to yieldingly bias said second section for rotation relative to said first section in opposite directions.

9. A pair of panel members, means joining said panel members for relative rotation about an axis disposed generally normal to said panel members and for relative angular displacement of one of said members relative to the other member between a first predetermined position and second and third positions with said one member rotated substantially 180° in opposite directions relative to the other member from said first position, and spring means connected between said panel members operative to yieldingly resist angular displacement of said one panel member relative to said other panel member from said first position toward either of said second and third positions, and latch means operative to releasably retain said one panel member in either of said second and third positions.

* * * * *